(12) United States Patent
Bui et al.

(10) Patent No.: US 7,852,599 B2
(45) Date of Patent: Dec. 14, 2010

(54) APPARATUS, SYSTEM, AND METHOD FOR TAPE DRIVE HEAD

(75) Inventors: Nhan Xuan Bui, Tucson, AZ (US); Reed Alan Hancock, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 12/036,794

(22) Filed: Feb. 25, 2008

(65) Prior Publication Data
US 2009/0213493 A1 Aug. 27, 2009

(51) Int. Cl.
G11B 5/584 (2006.01)
G11B 5/127 (2006.01)
G11B 5/09 (2006.01)

(52) U.S. Cl. .................. 360/77.12; 360/110; 360/48

(58) Field of Classification Search .......... 360/75, 360/110
See application file for complete search history.

(56) References Cited

U.S. PATENT DOCUMENTS

| | | | | |
|---|---|---|---|---|
| 5,488,525 | A | 1/1996 | Adams et al. | 360/104 |
| 6,005,737 | A | 12/1999 | Connolly et al. | 360/75 |
| 6,462,904 | B1 | 10/2002 | Albrecht et al. | 360/122 |
| 7,236,326 | B2 * | 6/2007 | Herring et al. | 360/92.1 |
| 7,505,221 | B2 * | 3/2009 | Watson | 360/53 |
| 7,675,710 | B2 * | 3/2010 | Hennecken et al. | 360/129 |
| 2009/0027803 | A1 * | 1/2009 | Biskeborn et al. | 360/77.12 |
| 2009/0147395 | A1 * | 6/2009 | McKinstry et al. | 360/75 |
| 2009/0207524 | A1 * | 8/2009 | Koeppe | 360/110 |

FOREIGN PATENT DOCUMENTS

| | | |
|---|---|---|
| JP | 54155019 | 12/1979 |
| JP | 2168401 | 6/1990 |

OTHER PUBLICATIONS

James a. Bain and William C. Messner, Limitations to Track Following Imposed by Position Error Signal SNR Using a Multi-Tapped Magnetoresistive Servo Head, IEEE Transactions on Magnetics, vol. 35. No. 2. Mar. 1999.

* cited by examiner

Primary Examiner—Daniell L Negrón
Assistant Examiner—Regina N Holder
(74) Attorney, Agent, or Firm—Kunzler Needham Massey & Thorpe

(57) ABSTRACT

An apparatus, system, and method are disclosed for a tape drive head. An upper servo element reads an upper servo track conforming to a specified format. A lower servo element reads a lower servo track conforming to the specified format. A mid servo element reads a mid servo track. The mid servo element is disposed between the upper servo element and the lower servo element. Sixteen legacy read elements are disposed between the upper server element and the lower servo element. The legacy read elements read legacy data tracks conforming to the specified format. At least eight incremental read elements are interleaved between the legacy read elements. One incremental read element is adjacent to each legacy read element on a side of the legacy read element away from the mid servo element.

20 Claims, 14 Drawing Sheets

APPARATUS, SYSTEM, AND METHOD FOR TAPE DRIVE HEAD

BACKGROUND OF THE INVENTION

1. Field of the Invention

This invention relates to tape drives and more particularly relates to tape drive heads.

2. Description of the Related Art

Magnetic tape is often used to cost-effectively store large amounts of data. Magnetic tape is referred to herein as tape. The tape may comprise a magnetic coating on a thin plastic strip. A write element may generate a magnetic field that selectively polarizes the magnetic coating to encode data on the tape. A read element may detect the various polarized areas on the tape. This information may be decoded to recover the data.

The write element and read element may be incorporated in head. The tape may be transported across the head to allow the write element to write data to the tape. In addition the tape may be transported across the head to allow the read element to read data from the tape.

A tape may be organized with a plurality of data bands disposed longitudinally along the tape. Each data band may comprise a plurality of data tracks disposed longitudinally within the data band. The head may be positioned relative to the tape to allow the head to write data to and/or read data from a specified set of tracks within a data band. The head must follow a data track to within tolerances specified by Track Mis-Registration (TMR) requirements.

There is a need to increase the track data density of tape in order to store more data on each tape and to also increase the data rate of the recorded information. For example, tape is often used to backup data storage systems. As a storage capacity of data storage systems increases, there is a corresponding need for both increased data storage capacity and data rate by tape. Also there are significant numbers of magnetic tapes storing important data that were written using legacy data formats, so there is significant market pressure to preserve the customer's investment in tape by being able read and write older format media as well as a new format in the same read/write tape device. In addition, increasing track data density makes it more difficult for a head to meet TMR requirements.

SUMMARY OF THE INVENTION

From the foregoing discussion, there is a need for an apparatus, system, and method for reading from and writing to tape. Beneficially, such an apparatus, system, and method would improve the reliability of high density data reads and writes.

The present invention has been developed in response to the present state of the art, and in particular, in response to the problems and needs in the art that have not yet been fully solved by currently available tape heads. Accordingly, the present invention has been developed to provide an apparatus, system, and method for a tape drive head that overcomes many or all of the above-discussed shortcomings in the art.

The head apparatus is provided with a plurality of elements configured to functionally execute the steps of reading an upper servo track, reading a lower servo track, reading a mid servo track, reading the legacy data tracks, and reading incremental data tracks. These elements in the described embodiments include an upper servo element, a lower servo element, a mid servo element, sixteen legacy read elements, and at least eight incremental read elements.

The upper servo element reads an upper servo track conforming to a specified format. The lower servo element reads a lower servo track conforming to the specified format. The mid servo element reads a mid servo track. In addition, the mid servo element is disposed between the upper servo element and the lower servo element.

The sixteen legacy read elements are disposed between the upper servo element and the lower servo element. The legacy read elements read legacy data tracks conforming to the specified format. The at least eight incremental read elements are interleaved between the legacy read elements. One incremental read element is adjacent to each legacy read element on a side of the legacy read element away from the mid servo element. The incremental read elements read incremental data tracks.

A system of the present invention is also presented to read data. The system may be embodied in a tape drive. In particular, the system, in one embodiment, includes a tape and a head.

The tape stores magnetically encoded data. The head includes an upper servo element, a lower servo element, a mid servo element, sixteen legacy read elements, and least eight incremental read elements.

The upper servo element reads an upper servo track conforming to a specified format. The lower servo element reads a lower servo track conforming to the specified format. The mid servo element reads a mid servo track. In addition, the mid servo element is disposed between the upper servo element and the lower servo element.

The sixteen legacy read elements are disposed between the upper server element and the lower servo element. The legacy read elements read legacy data tracks conforming to the specified format. The at least eight incremental read elements are interleaved between the legacy read elements. One incremental read element is adjacent to each legacy read element on a side of the legacy read element away from the mid servo element. The incremental read elements read incremental data tracks.

A method of the present invention is also presented for reading data. The method in the disclosed embodiments substantially includes the steps to carry out the functions presented above with respect to the operation of the described apparatus and system. In one embodiment, the method includes reading an upper servo track, reading a lower servo track, reading a mid servo track, reading the legacy data tracks, and reading incremental data tracks.

An upper servo element reads an upper servo track conforming to a specified format. A lower servo element reads a lower servo track conforming to the specified format. The mid servo element reads a mid servo track disposed between the upper data track and the lower data track.

Sixteen legacy read elements read legacy data tracks conforming to the specified format. The legacy data tracks are disposed between the upper servo track and the lower servo track. Incremental read elements read at least eight incremental data tracks interleaved between the legacy data tracks. One incremental data track is adjacent to each legacy data track on a side of the legacy data track away from the mid servo track.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention interleaves incremental data tracks with legacy data tracks to increase data density. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may be stored on a tangible storage medium and may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
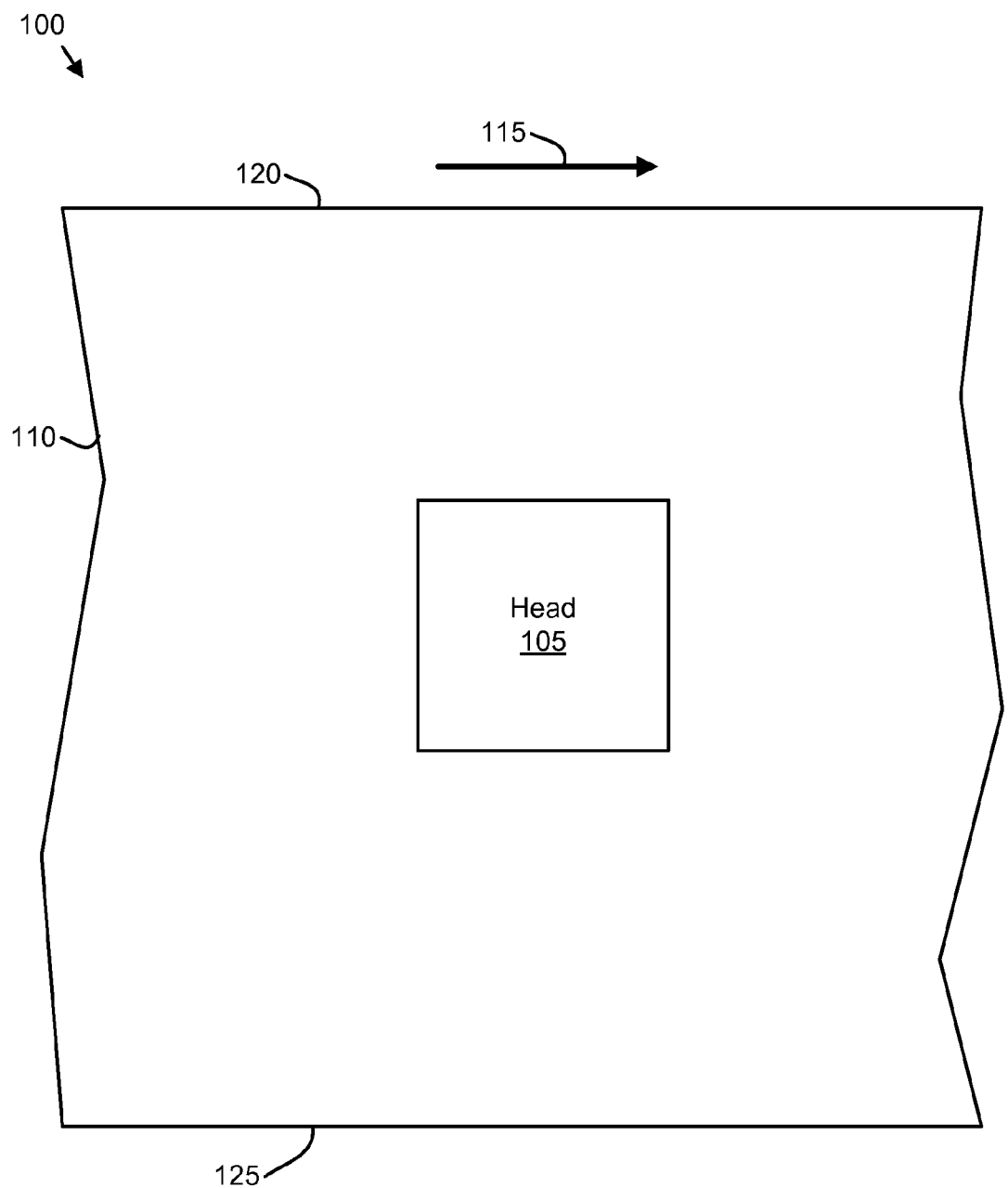
FIG. 1 is a schematic block diagram illustrating one embodiment of a tape and head in accordance with the present invention.

FIG. 1 is a schematic block diagram illustrating one embodiment of a tape and head 100 in accordance with the present invention. A tape 110 is configured to move in a direction of motion 115. In one embodiment, one or more servos motivate at least two reels to transport the tape 110 as is well known to those skilled in the art.

A head 105 is positioned over one or more portions of the tape 110. The head 105 may contain one or more write elements and one or more read elements. A write element may generate a magnetic field that polarizes a specified area of magnetic coating on the tape 110. The organization of magnetically polarized areas on the tape 110 may encode data as is well known to those skilled in the art.

A read element may generate a signal that corresponds to the polarization of the various areas of magnetic coating on the tape 110. The signal may be interpreted to decode the data stored on the tape 110.

Figure 2:
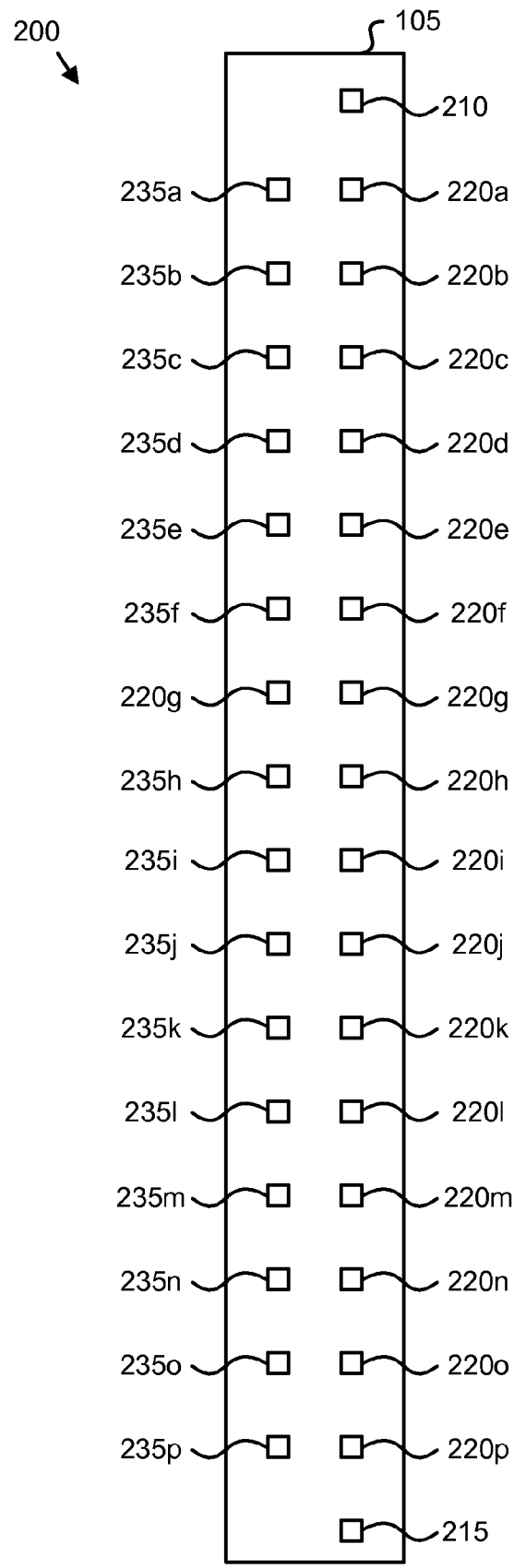
FIG. 2 is a schematic block diagram illustrating one embodiment of a head configuration.

FIG. 2 is a schematic block diagram illustrating one embodiment of a head configuration 200. The head configuration 200 illustrates one disposition of read elements 220 and write elements 235 of the head 105 of FIG. 1. The description of the head configuration 200 refers to elements of FIG. 1, like numbers referring to like elements. In one embodiment, the read elements 220 read data tracks comprising a data band. An upper servo element 210 and a lower servo element 215 may read to servo tracks that bound the data band. The head 105 may use the servo tracks to track the motion of the tape 110 and the position of the head 105 relative to the tape 110.

In one embodiment, the read elements 220 read data tracks conforming to a legacy format such as a Linear Tape Open (LTO) standard. Alternatively, the read elements 220 may read data tracks conforming to an IBM 3592 format.

The write elements 235 may write the data tracks. The upper servo element 210 and lower servo element 215 may position the read elements 220 while reading data tracks. In one embodiment, the write elements 235 write data during a first pass of the tape 110. The read elements 220 may read the data during a subsequent second pass of the tape 110. Alternatively, the head 105 may perform a write with a read after write. The write elements 235 may write data to the tape 110 and the read elements 220 may immediately read the data so that the data written to the tape 110 may be verified on the same pass of tape over the head 105.

Although the write elements 235 are shown coplanar with and adjacent to the read elements 220, one of skill in the art will recognize that the write elements 235 may be integrated with the read elements 220 and/or may not be coplanar with the read elements 220. The read elements 220 are referred to hereafter as legacy read elements 220. In addition, the data tracks written by the legacy read elements 220 are referred to hereafter as legacy data tracks.

Figure 3:
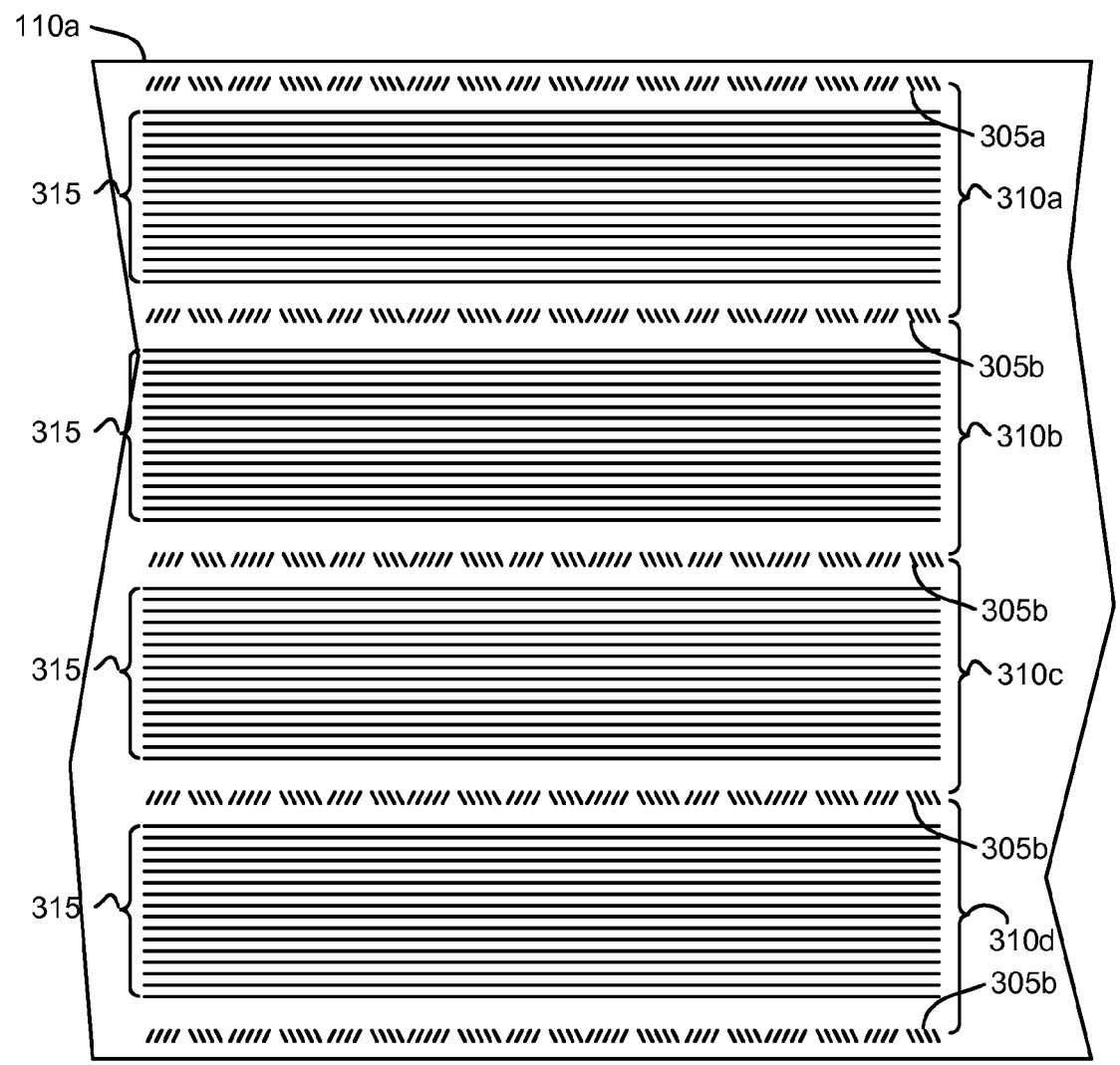
FIG. 3 is a schematic block diagram illustrating one embodiment of a tape.

FIG. 3 is a schematic block diagram illustrating one embodiment of a tape 110a. The tape 110a is the tape 110 of FIG. 1 and is written with a legacy format such as an LTO format or an IBM 3592 format. The description of the tape 110a refers to elements of FIGS. 1-2, like numbers referring to like elements.

One or more servo tracks 305 are shown or written to the tape 110a. In one embodiment, the servo tracks 305 are written during the manufacture of the tape 110a. The write elements 235 may write data tracks in sub bands 315 between the servo tracks 305. Each sub band 315 includes one or more data tracks. Sub bands will be described in more detail in FIG. 5C. The area between the servo tracks 305 and any data tracks written therein comprises a data band 310. The tape 110a is shown with four (4) data bands 310.

Figure 4A:
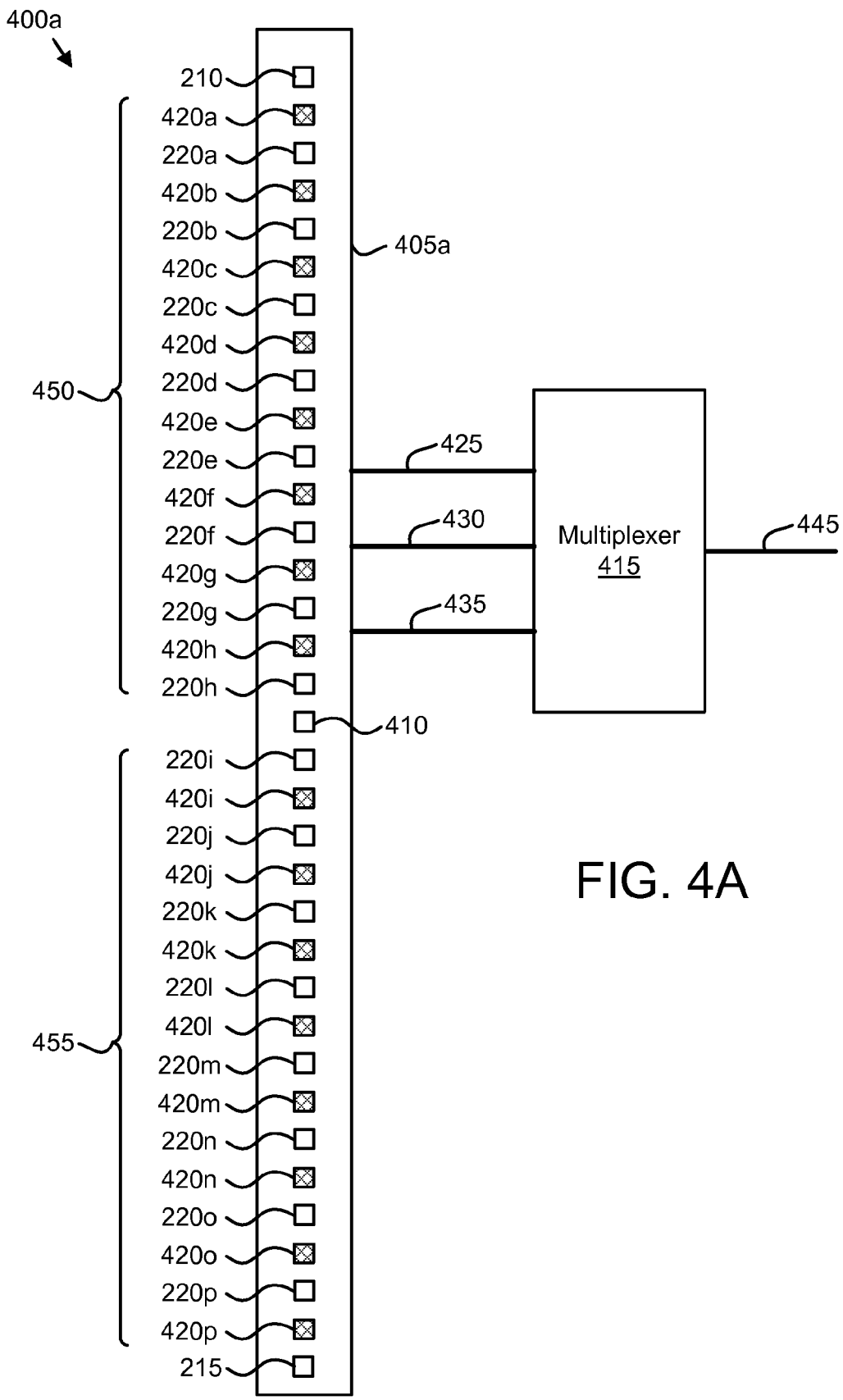
FIG. 4A is a schematic block diagram illustrating one embodiment of a head of the present invention.

FIG. 4A is a schematic block diagram illustrating one embodiment of a head 405a of the present invention. The description of the head 405a refers to elements of FIGS. 1-3, like numbers referring to like elements. The head 405a includes the upper servo element 210, the lower servo element 215, and the read elements 220 of FIG. 2. In addition, the head 405a includes one or more incremental read elements 420 interleaved between the legacy read elements 220. One incremental read element 420 is adjacent to each legacy read element 220 on a side of the legacy read element 220 away from a mid servo element 410.

In one embodiment, the legacy read elements 220 read data tracks in sub bands 315 conforming to the LTO standard. Alternatively, the legacy read elements 220 may read data tracks in sub bands 315 conforming to the IBM 3592 format. One of skill in the art will recognize that the legacy read elements 220 may also be used to read other legacy tape formats. The upper servo element 210 and the lower servo element 215 read servo tracks 305 to position the head 405a with a data band 310. Thus the head 405a may be used to read legacy tapes 110a.

The mid servo element 410 reads a mid servo track. The mid servo element 410 is disposed between the upper servo element 210 and the lower servo element 215. In one embodiment, the mid servo element 410 is disposed midway between the upper servo element 210 and the lower servo element 215.

The incremental read elements 420 are configured to read incremental data tracks. In the depicted embodiment, there are sixteen (16) incremental read elements 420. In one embodiment, the legacy read elements 220 and the incremental read elements 420 together may read thirty-two (32) data tracks. The upper servo element 210, mid servo element 410, and the lower servo element 215 may read servo tracks 305 to position the head 405a relative to a data band 310. This is the High Density option depicted in FIGS. 7, 8, and 9. Alternatively, the upper servo element 210 and the lower servo element 215 may read servo tracks 305 to position the head 405a relative to the data band 310. This is the Legacy option depicted in FIGS. 7, 8, and 9.

In one embodiment, the legacy and incremental read elements 220, 420 include write elements. The write elements may be configured to write data. The write elements may be co-located with the legacy and incremental read elements 220, 420. Alternatively, the write elements may be disposed along the direction of tape motion 115 from a corresponding read element 220, 420 as shown in FIG. 2.

Because of the close tolerances between the legacy read elements 220 and the incremental read elements 420, it may be difficult to bring thirty-two (32) write and read data lines into and out of the head 405a. In one embodiment, a multiplexer 415 selects between read signals from combinations of legacy read elements 220 and/or incremental read elements 420. The multiplexer 415 may output the selected read signals as a signal bus 445. In addition, the multiplexer 415 may select between read signals from complimentary combinations of legacy write elements and incremental write elements and input the selected write signals from the signal bus 445.

In one embodiment, the multiplexer 415 selects first read signals 425 comprising read signals from the legacy read elements 220. Alternatively, the multiplexer 415 may select second read signals 430 comprising read signals from upper read elements 450. The upper read elements 450 may include the legacy read elements 220a-h and the incremental read elements 420a-h between the upper servo element 210 and a mid servo element 410. In a certain embodiment, the multiplexer 415 also selects write signals from the signal bus 445 that correspond to the selected read elements 220, 420.

The upper read elements 450 may read data tracks comprising an upper data band. A first distance between an upper most read element 450a and a lowest read element 220h of the sixteen (16) legacy and incremental read elements 220a-h, 420a-h is less than a second distance between an upper most data track and a lowest data track on the data band 310 of FIG. 3. Because the first distance is smaller, the track dimensional stability for the head 405a is improved. As a result, the data density of data bands on the tape 110 is increased without excessive TMR requirements.

In one embodiment, the multiplexer 415 selects third read signals 435 comprising read signals from lower read elements 455. The lower read elements 455 may include the legacy read elements 220i-p and the incremental read elements 420i-p between the mid servo element 410 and the lower servo element 215. Reading data tracks with the lower read elements 455 also increases the data density of data bands 310 on the tape 110 without excessive TMR requirements.

Figure 4B:
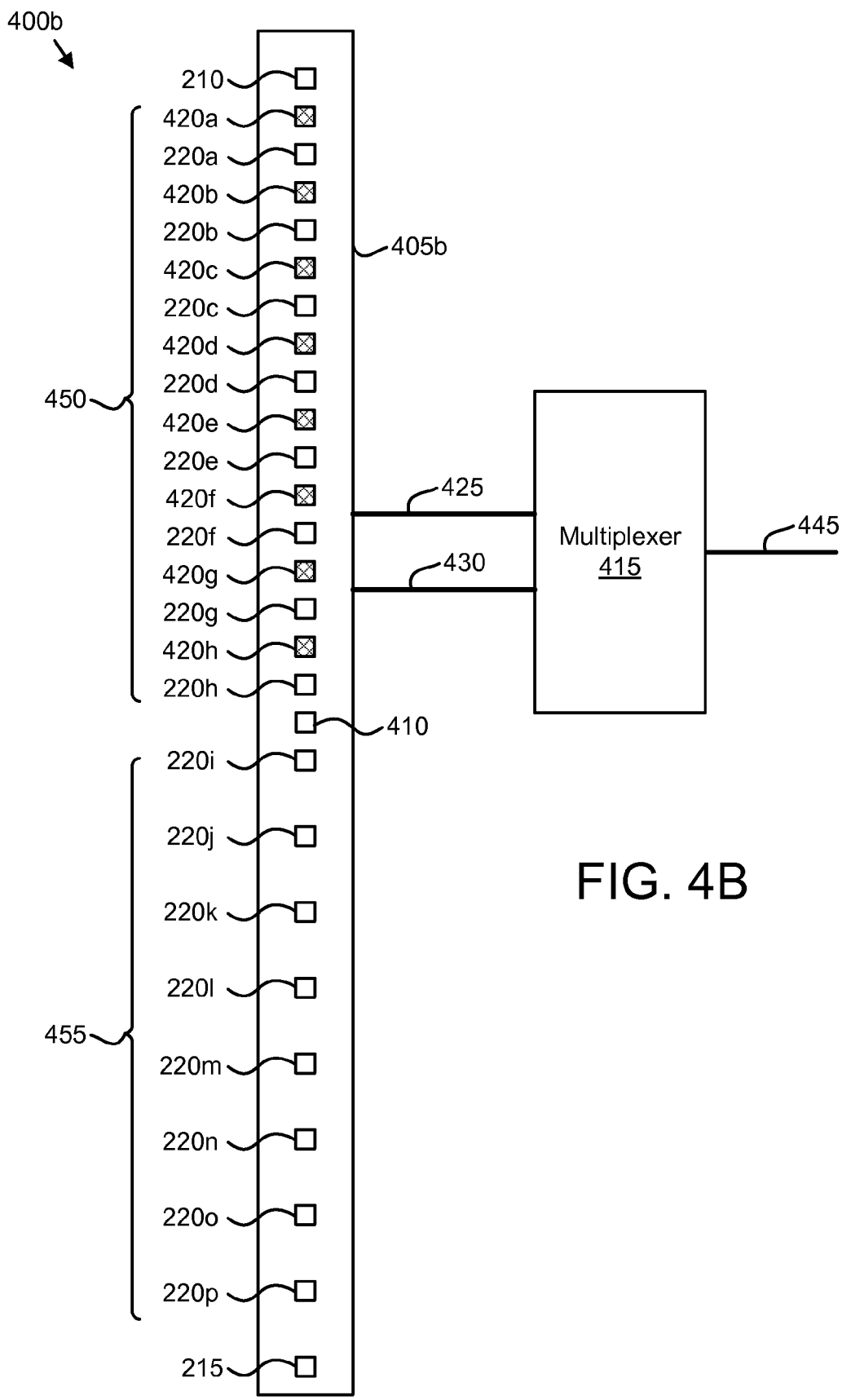
FIG. 4B is a schematic block diagram illustrating one alternate embodiment of a head of the present invention.

FIG. 4B is a schematic block diagram illustrating one alternate embodiment of the head 405b of the present invention. The head 405 of FIG. 4A is shown with the upper incremental write elements 420a-h and without the lower incremental write elements 420i-p.

The legacy read elements 220 read data tracks conforming to a specified format such as the LTO standard and/or IBM 3592 format. Alternatively, the upper read elements 450 may read data tracks comprising an upper data band. Reading data tracks with the lower read elements 455 increases the data density of data bands 310 on the tape 110 without excessive TMR requirements as track dimensional stability for the head 405b is improved.

In one embodiment, the legacy and incremental read elements 220, 420 include write elements. The write elements may be configured to write data. The write elements may be co-located with the legacy and incremental read elements 220, 420. Alternatively, the write elements may be disposed along the direction of tape motion 115 from a corresponding read element 220, 420 as shown in FIG. 2. In one embodiment, the write elements are offset from the plane of the read elements 220, 420.

In one embodiment, read signals from the read elements 220, 420 are selected using the multiplexer 415. The multiplexer 415 may select first read signals 425 comprising read signals from the legacy read elements 220. Alternatively, the multiplexer 415 may select second read signals 430 comprising read signals from upper read elements 450. The multiplexer 415 may output the selected read signals as a signal bus 445. In a certain embodiment, the multiplexer 415 also selects write signals from the signal bus 445 that correspond to the selected read elements 220, 420.

Figure 4C:
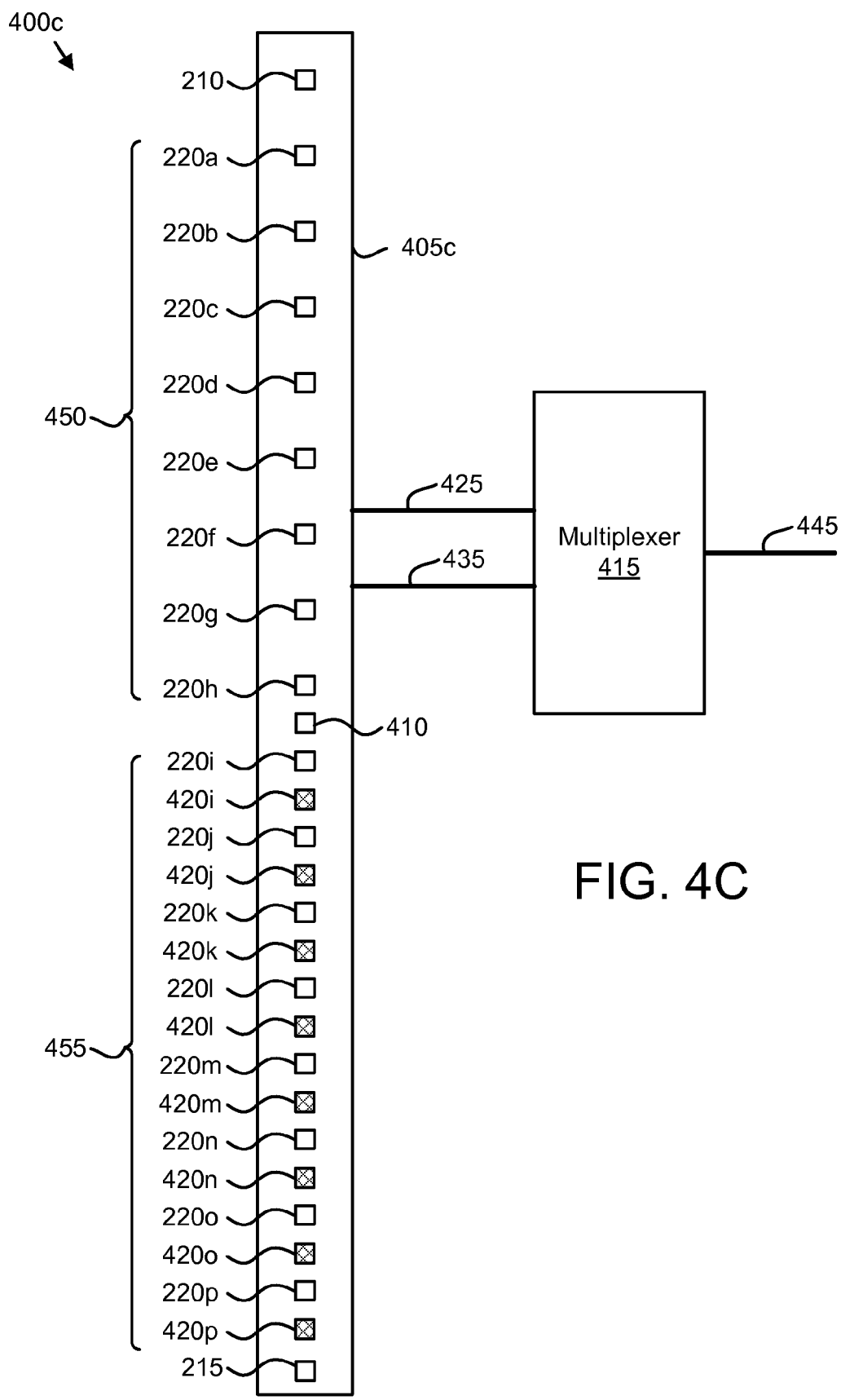
FIG. 4C is a schematic block diagram illustrating another alternate embodiment of a head of the present invention.

FIG. 4C is a schematic block diagram illustrating another alternate embodiment of the head 405c of the present invention. The head 405a of FIG. 4A is shown with the lower incremental write elements 420i-p and without the upper incremental write elements 420a-h.

The legacy read elements 220 may read data tracks conforming to a legacy tape standard such as the LTO standard and/or IBM 3592 format. Alternatively, the lower read elements 455 may read data tracks comprising a lower data band. Reading data tracks with the lower read elements 455 increases the data density of data bands 310 on the tape 110 without excessive TMR requirements as track dimensional stability for the head 405c is improved.

In one embodiment, the legacy and incremental read elements 220, 420 include write elements. The write elements may be configured to write data. The write elements may be co-located with the legacy and incremental read elements 220, 420. Alternatively, the write elements may be disposed along the direction of tape motion 115 from a corresponding read element 220, 420 as shown in FIG. 2.

Read signals from the read elements 220, 420 may be selected using the multiplexer 415. The multiplexer 415 may select first read signals 425 comprising read signals from the legacy read elements 220. Alternatively, the multiplexer 415 may select third read signals 435 comprising read signals from lower read elements 455. The multiplexer 415 may output the selected read signals as a signal bus 445. In a certain embodiment, the multiplexer 415 also selects write signals from the signal bus 445 that correspond to the selected read elements 220, 420.

Figure 5A:
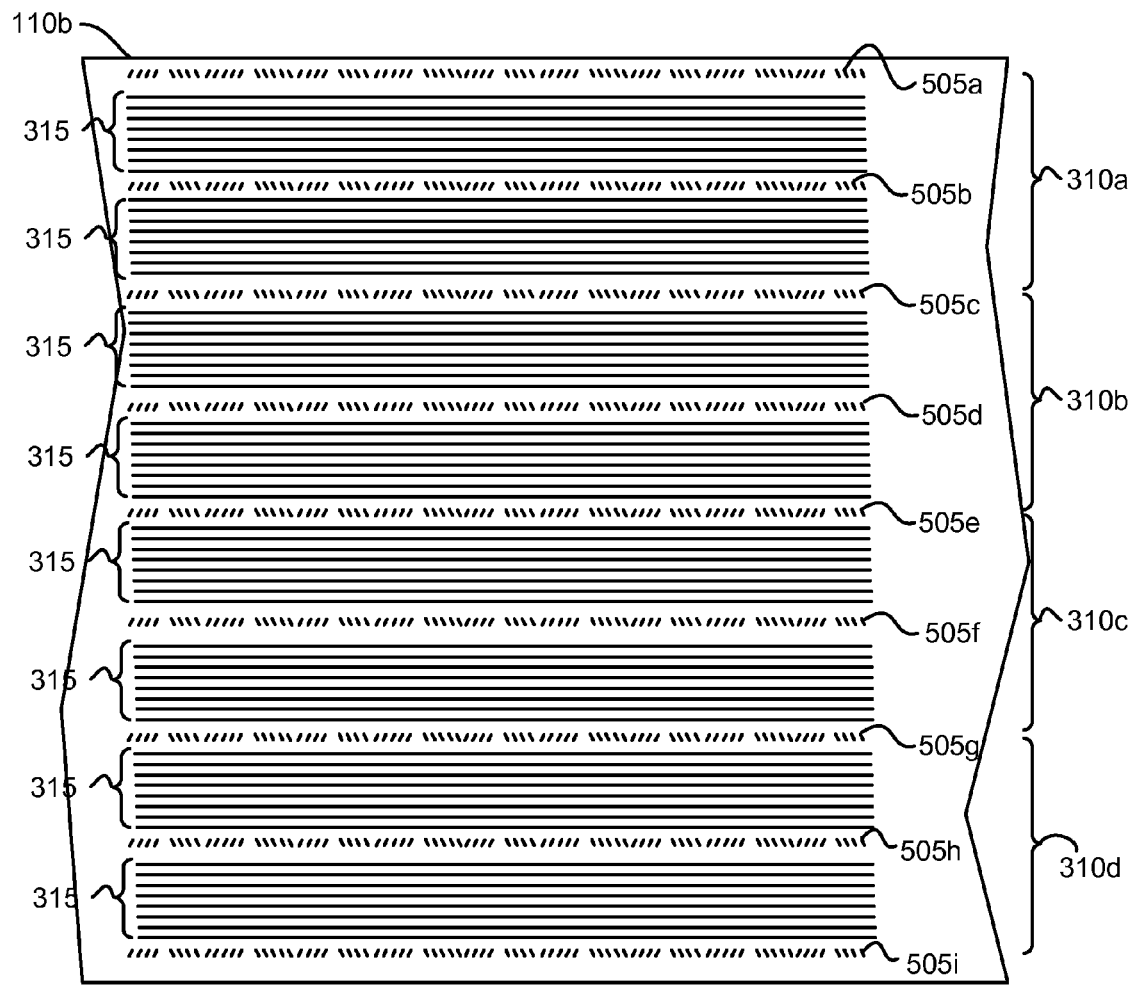
FIG. 5A is a schematic block diagram illustrating one embodiment of a tape of the present invention.

FIG. 5A is a schematic block diagram illustrating one embodiment of a tape 110b of the present invention. The tape 110b is read using the heads 405a-c of FIGS. 4A-4C. The description of the tape 110b refers to elements of FIGS. 1-4C, like numbers referring to like elements.

The tape 110b includes a plurality of data bands 310 organized longitudinally on the tape 110b as for the tape 110a of FIG. 1. Each data band 310 includes an upper servo track 505 and a lower servo track 505. For example, a first data band 310a includes a first servo track 505a as the upper servo track 505 and a third servo track 505c as the lower servo track 505. In one embodiment, the upper and lower servo tracks 505 conform to the new LTO standard and/or new IBM 3592 format. A mid servo track 505 is disposed between the upper servo track 505 and the lower servo track 505. For example, a second servo track 505b may be the first data band 310a mid servo track 505.

In the depicted embodiment, the data bands 310 conform to the LTO standard and/or IBM 3592 format. The head 405a-c may read the data tracks in sub bands 315 of the first data band 310a. In one embodiment, write elements may also write the data tracks in the sub bands 315 of the data bands 310. Thus the present invention allows the reading and writing of tapes 110b with legacy data formats.

5B is a schematic block diagram illustrating one alternate embodiment of a tape 110c of the present invention. The tape 110c is read using the heads 405a-c of FIGS. 4A-4C. The description of the tape 110c refers to elements of FIGS. 1-4C, like numbers referring to like elements.

Figure 5B:
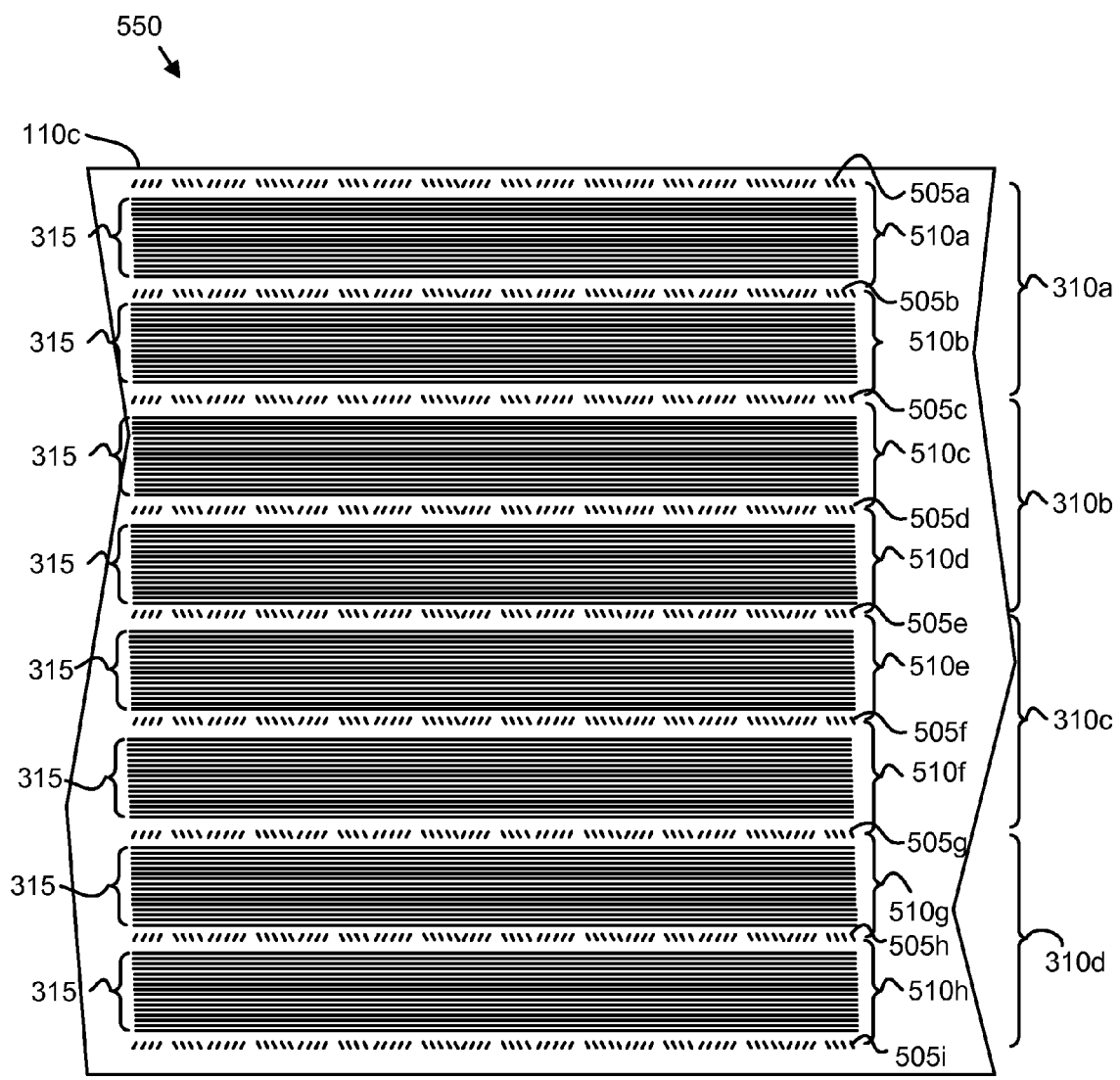
FIG. 5B is a schematic block diagram illustrating one alternate embodiment of a tape of the present invention.

In addition to the legacy data bands 310 shown for FIGS. 3, 5A, and 5B, the tape 110c supports a plurality of high density data bands 510. The tape 110c is shown with eight (8) high density data bands 510. In one embodiment, sixteen (16) sub bands 315 between two (2) servo tracks 505 form a high density data band 510. For example, the sixteen (16) sub bands 315 of a first high density data band 510a may be read by the heads 405a-c of FIGS. 4A-4C.

In an alternate embodiment, a data band 310 may include sixteen (16) legacy sub bands 315 and sixteen (16) incremental sub bands 315 from two high density data bands 510. For example, a second data band 310b may include thirty-two (32) sub bands 315. The head 405a of FIG. 4A may read the second data band 310b.

Figure 5C:
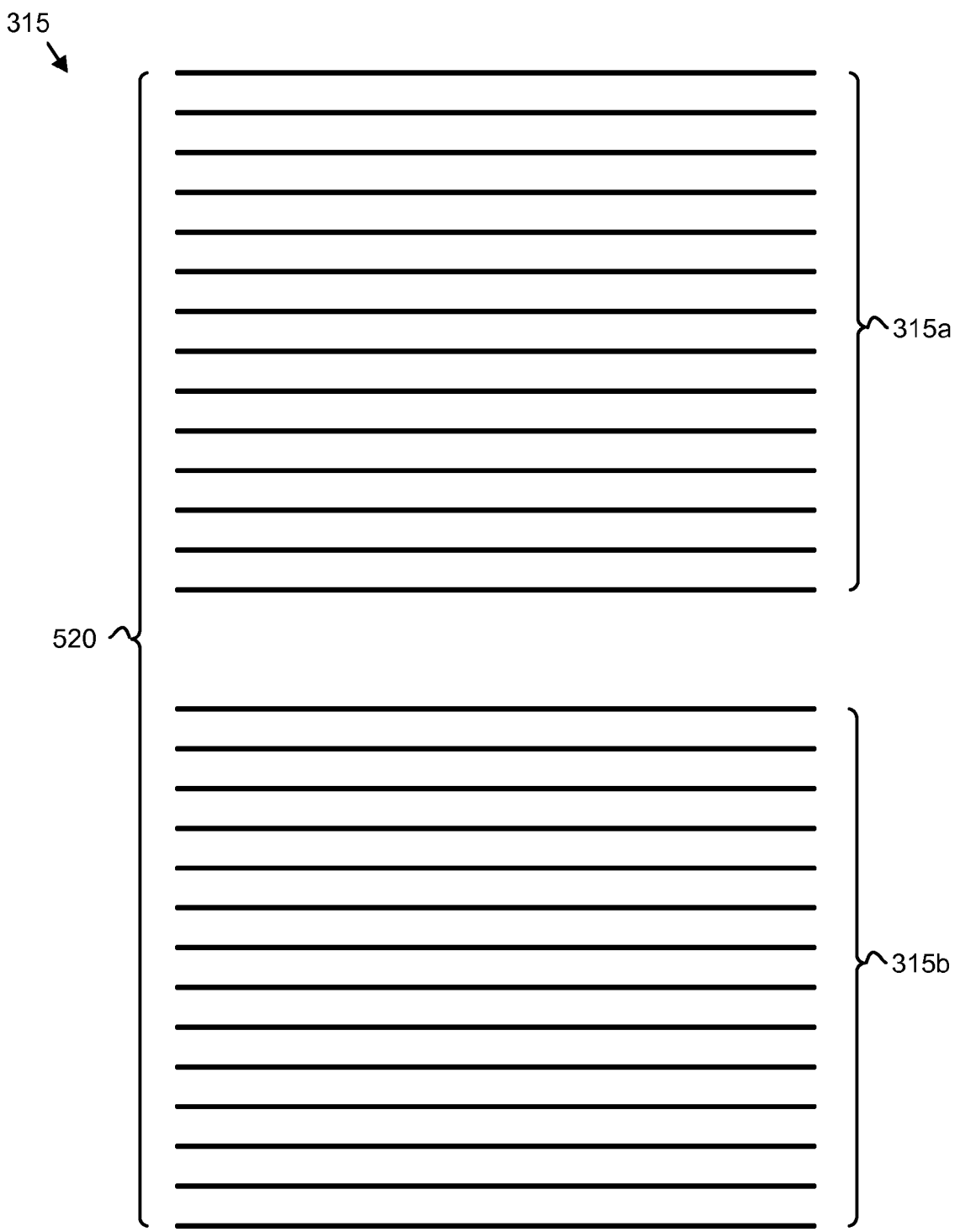
FIG. 5C is a schematic block diagram illustrating one embodiment of sub data bands.

FIG. 5C is a schematic block diagram illustrating one embodiment of sub bands 315. The sub bands 315 are the sub bands 315 of FIGS. 3, 5A, and 5B. Two sub bands 315a,b are shown. Each sub band 315 includes one or more data tracks 520. Although each sub band 315 is shown with fourteen (14) data tracks 520, a sub band 315 may have any number of data tracks 520.

In one embodiment, the head 105 may make multiple passes over a tape 110, with each read element 220, 420 reading a different data track 520 of a sub band 315 during each pass. Each data track 520 may thus be part of a distinct wrap as is well known to those of skill in the art.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Steps may incur in various combinations, including concurrently. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
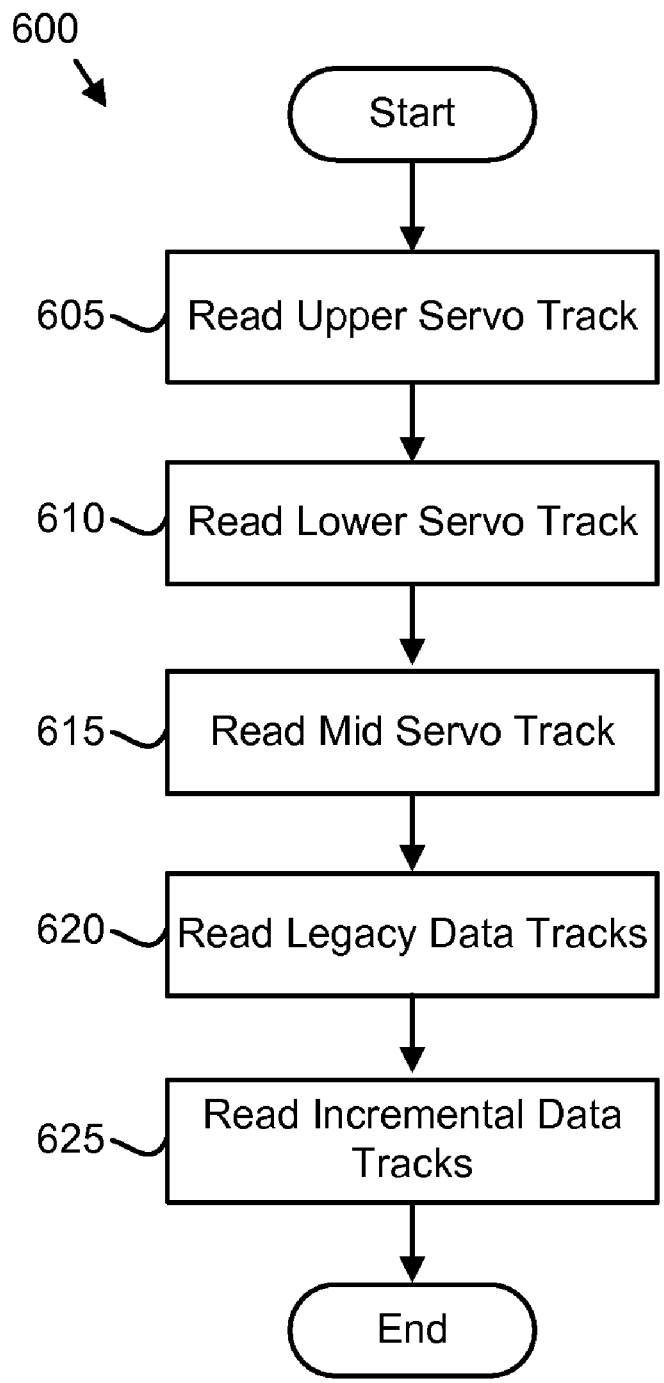
FIG. 6 is a schematic flow chart diagram illustrating one embodiment of a read method of the present invention.

FIG. 6 is a schematic flow chart diagram illustrating one embodiment of a read method 600 of the present invention. The method 600 substantially includes the steps to carry out the functions presented above with respect to the operation of the described apparatus and system of FIGS. 1-5. The description of the method 600 refers to elements of FIGS. 1-5, like numbers referring to like elements.

The method 600 starts and the upper servo element 210 reads 605 an upper servo track 505 conforming to a specified format. The specified format may be a LTO standard and/or the IBM 3592 format. For example, the specified format may be the LTO 3 format.

The lower servo element 215 reads 610 a lower servo track 505 conforming to the specified format. The mid servo element 410 reads 615 a mid servo track 505 disposed between the upper data tracks and the lower data tracks.

The legacy read elements 220 read 620 legacy data tracks 520 conforming to the specified format. The legacy data tracks 520 are disposed between the upper servo track 505 and the lower servo track 505. The incremental read elements 420 read 625 at least eight (8) incremental data tracks 520 interleaved between the legacy data tracks and the method 600 ends. One incremental data track 520 is adjacent to each legacy data track 520 on a side of the legacy data track away from the mid servo track 505.

In one embodiment, the upper servo element 210 reads 605 the upper servo track 505, the mid servo element 410 reads 615 the mid servo track 505, sixteen upper legacy read elements 220a-h and incremental read elements 420a-h read 620, 625 data tracks 520 in a high density data band 510. Alternatively, the lower servo element 215 may read 610 the lower servo track 505, the mid servo element 410 may read 615 the mid servo track 505, sixteen lower legacy read elements 220i-p and incremental read elements 420i-p may read 620, 625 data tracks 520 in a high density data band 510.

In a certain embodiment, the upper servo element 210 reads 605 the upper servo track 505, the lower servo element 215 reads 610 the lower servo track 505, and the sixteen (16) legacy read elements 220a-p read 620 legacy data tracks 520. Thus the present invention may read the data stored on legacy tape 110.

In an alternate embodiment, the upper servo element 210 reads 605 the upper servo track 505. In addition, the lower servo element 215 reads 610 the lower servo track 505 and the mid servo element 410 reads 615 the mid servo track 505. The sixteen (16) legacy read elements 220a-p read 620 legacy data tracks 520 and the incremental read elements 420 read 625 sixteen (16) incremental data tracks 520. Thus the present invention may read thirty-two (32) data tracks 520.

In one embodiment, the method 600 is implemented with a computer program product comprising a computer readable medium stored on a tangible storage device having a computer readable program. The computer readable program may be integrated into a tape drive computing system, wherein the program in combination with the computing system is capable of performing the method 600.

Figure 7:
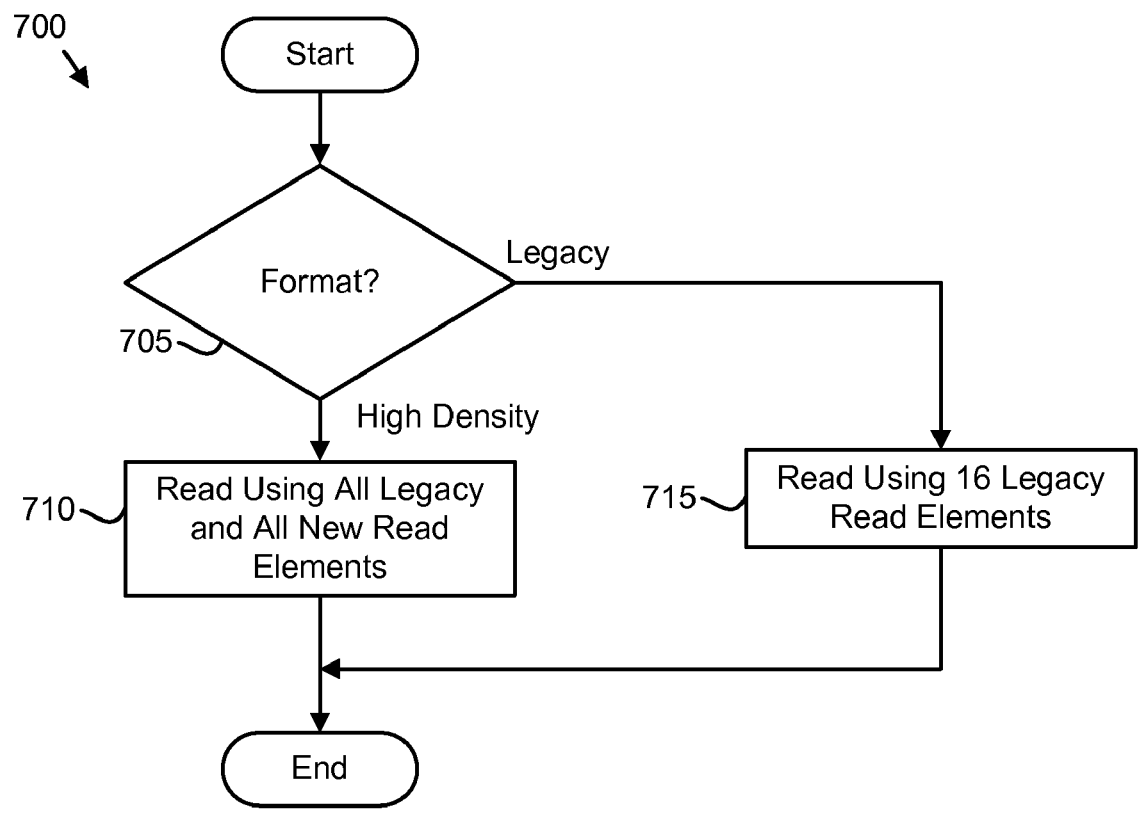
FIG. 7 is a schematic flow chart diagram illustrating one embodiment of a read selection method of the present invention.

FIG. 7 is a schematic flow chart diagram illustrating one embodiment of a read selection method 700 of the present invention. The description of the method 700 refers to elements of FIGS. 1-6, like numbers referring to like elements.

In one embodiment, the method 700 starts and the head 405 reads a portion of the tape 110. A tape drive may determine 710 if the tape 110 is formatted with the legacy format or if the tape 110 is formatted with a high density format. The high density format may comprise high density data bands 510. If the tape 110 is formatted with the legacy format such as LTO 3, the head 405 reads 715 the tape 110 using the sixteen (16) legacy read elements 220.

If the tape 110 is formatted with a high density format, the head 405 may read 710 the tape 110 using the sixteen (16) legacy read elements 220 and sixteen (16) incremental read elements 420. The method 700 allows the tape drive to read the tape 110 regardless of whether the tape 110 is written in a sixteen (16) data track legacy format or a sixteen (16) data track high density format.

Figure 8:
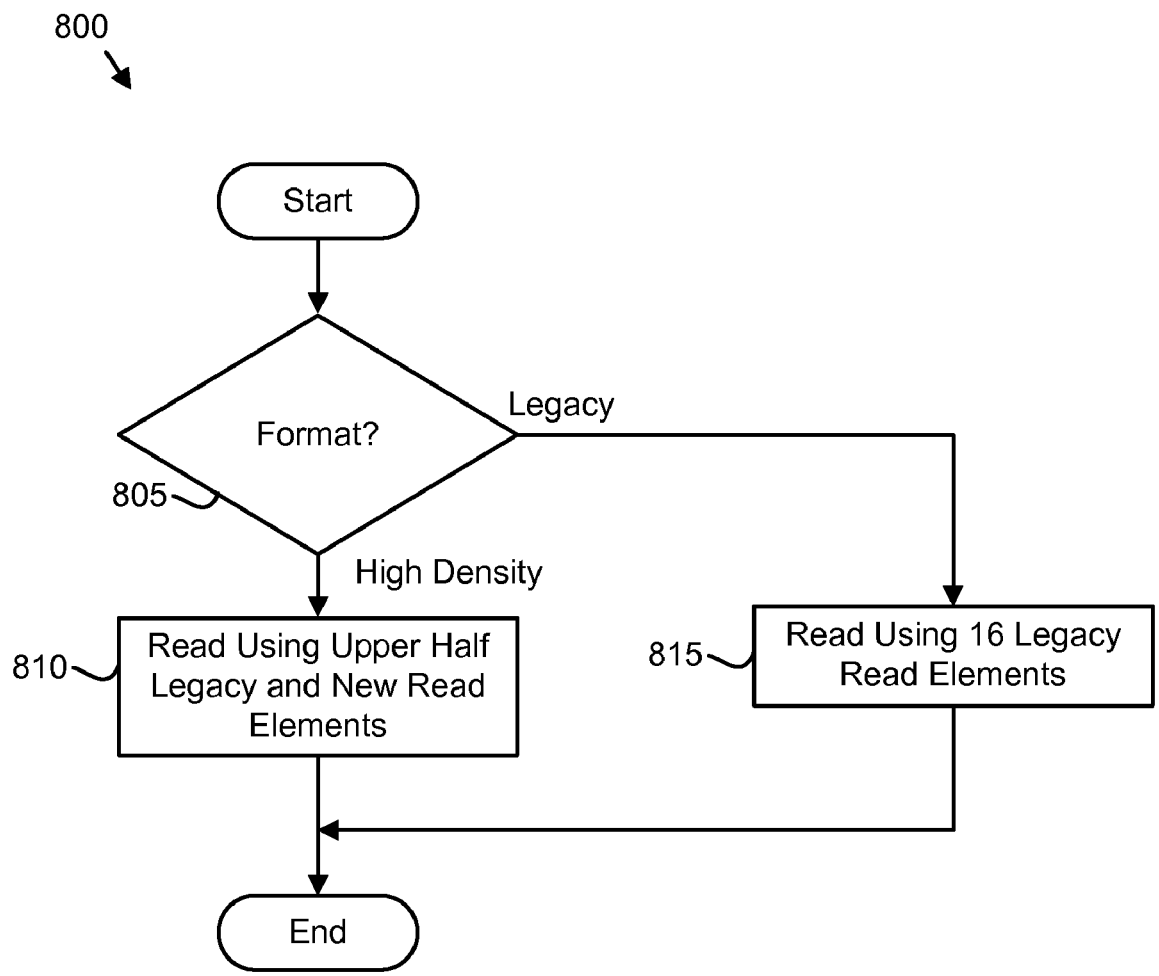
FIG. 8 is a schematic flow chart diagram illustrating one alternate embodiment of a read selection method of the present invention.

FIG. 8 is a schematic flow chart diagram illustrating one alternate embodiment of a read selection method of the present invention. The description of the method 800 refers to elements of FIGS. 1-6, like numbers referring to like elements.

In one embodiment, method starts 800 and the head 405 reads a portion of the tape 110. The tape drive may determine 810 if the tape 110 is formatted with the legacy format or if the tape 110 is formatted with a high density format. If the tape 110 is formatted with the legacy format such as IBM 3592 format, the head 405 reads 815 the tape 110 using the sixteen (16) legacy read elements 220.

If the tape 110 is formatted with a high density format, the head 405 may read 810 the tape 110 using the eight (8) upper legacy read elements 220a-h and the eight (8) upper incremental read elements 420a-h. In one embodiment, the head 405b of FIG. 4B reads 810 the tape using the upper read elements 450. The method 800 allows the tape drive to read the tape 110 regardless of whether the tape 110 is written in a legacy format or a sixteen (16) data track high density format.

Figure 9:
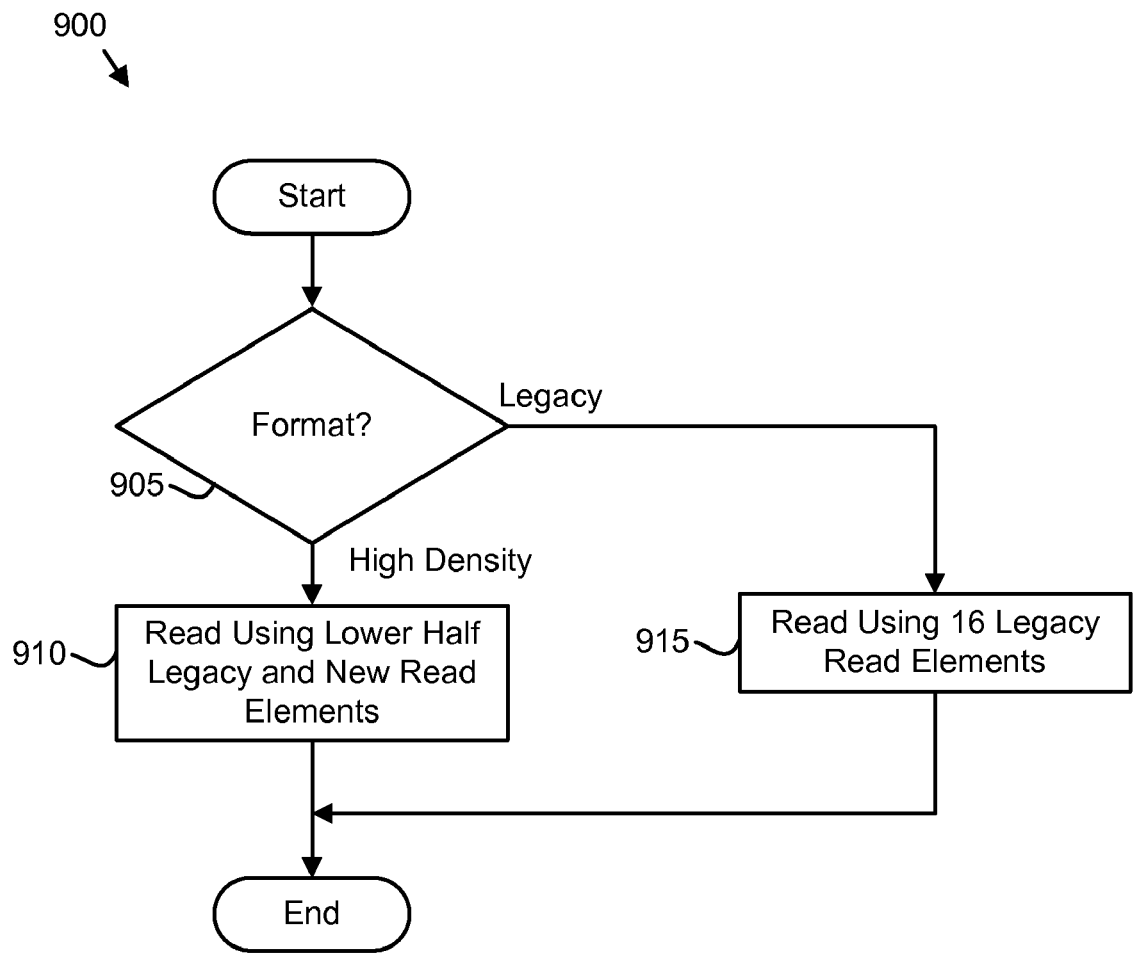
FIG. 9 is a schematic flow chart diagram illustrating another alternate embodiment of a read selection method of the present invention.

FIG. 9 is a schematic flow chart diagram illustrating another alternate embodiment of a read selection method 900 of the present invention. The description of the method 900 refers to elements of FIGS. 1-6, like numbers referring to like elements.

In one embodiment, the head 405 reads a portion of the tape 110. The tape drive may determine 910 if the tape 110 is formatted with the legacy format or if the tape 110 is formatted with a high density format. If the tape 110 is formatted with a legacy format such as the LTO 2 format, the head 405 reads 915 the tape 110 using the sixteen (16) legacy read elements 220.

If the tape 110 is formatted with a high density format, the head 405 reads 910 the tape 110 using the eight (8) lower legacy read elements 220i-p and the eight (8) lower incremental read elements 420i-p. In one embodiment, the head 405c of FIG. 4C reads the tape 110 using the lower read elements 455. The method 900 allows the tape drive to read the tape 110 regardless of whether the tape 110 is written in a legacy format or a sixteen (16) data track high density format.

Figure 10:
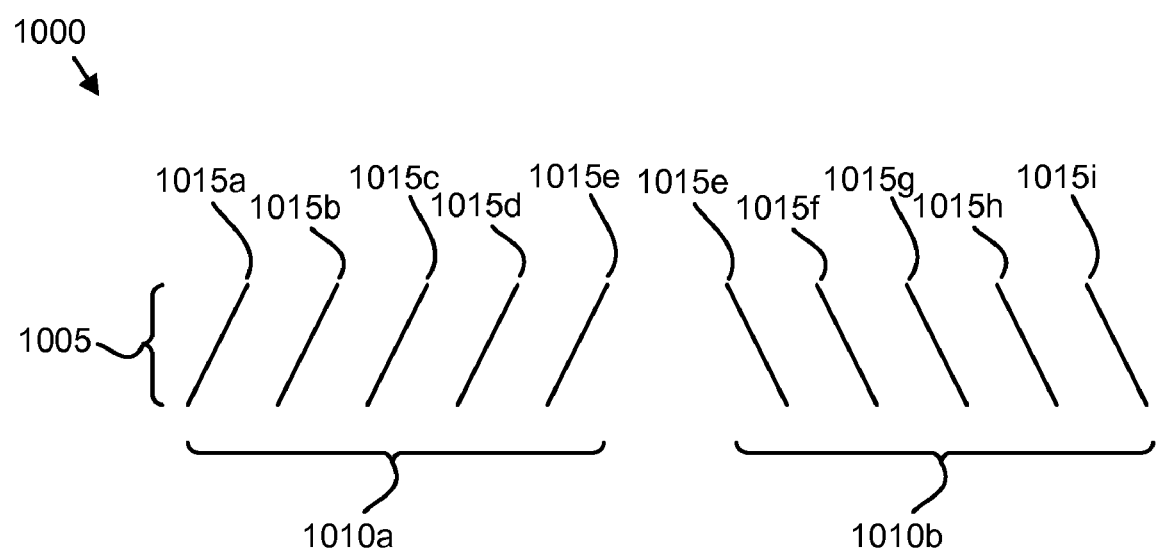
FIG. 10 is a schematic block diagram illustrating one embodiment of a servo mark of the present invention.

FIG. 10 is a schematic block diagram illustrating one embodiment of a servo mark 1000 of the present invention. The servo mark 1000 includes two servo mark groups 1010. Each servo mark group 1010 includes either four or five marks 1015. The servo mark groups 1010 are depicted with five marks 1015 each. Servo mark groups 1010 may be organized in a pattern of five (5) marks 1015, five (5) marks 1015, four (4) marks 1015, four (4) marks 1015, or 5 5 4 4 5 5 4 4 to form the servo tracks 505 of FIG. 5.

In one embodiment, a height 1005 of each servo track 505 is ninety micrometers (90 μm). In an alternate embodiment, the height 1005 of each servo track 505 is in the range of eighty to one hundred micrometers (80-100 μm).

The present invention interleaves incremental data tracks with legacy data tracks to increase data density. In addition, the present invention maintains the ability to read legacy tapes. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A head to read data, the head comprising:
an upper servo element configured to read an upper servo track conforming to a specified format;
a lower servo element configured to a read a lower servo track conforming to the specified format;

a mid servo element configured to read a mid servo track and disposed between the upper servo element and the lower servo element;

sixteen legacy read elements disposed between the upper servo element and the lower servo element and configured to read legacy data tracks conforming to the specified format; and eight incremental read elements interleaved between the legacy read elements disposed between the upper servo element and the mid servo element so that one incremental read element is adjacent to each legacy read element on a side of the legacy read element away from the mid servo element, the incremental read elements configured to read incremental data tracks.

2. The head of claim 1, the head further configured to read an upper data band of sixteen sub bands using eight legacy read elements and the eight incremental read elements disposed between the upper servo element and the mid servo element such that a distance between an upper most read element and a lowest read element of the sixteen legacy and incremental read elements is less than a distance between an upper most data track and a lowest data track on a data band compatible with the specified format.

3. The head of claim 2, further configured to read an upper data band of eight data bands on a tape.

4. The head of claim 1, the head further configured to read a lower data band of sixteen sub bands using eight legacy read elements and eight incremental read elements between the lower servo element and the mid servo element such that a distance between an upper most read element and a lowest read element of the sixteen legacy and incremental read elements is less than a distance between an upper most sub band and a lowest sub band on a data band compatible with the specified format.

5. The head of claim 4, further configured to read a lower data band of eight data bands on a tape.

6. The head of claim 1, wherein the head comprises sixteen incremental read elements.

7. The head of claim 1, further comprising a multiplexer configured to connect either eight legacy read elements or eight incremental read elements to a communication bus.

8. The head of claim 1, further comprising a multiplexer configured to connect either sixteen upper or sixteen lower read elements to a communication bus.

9. The head of claim 1, wherein the head is further configured to read and write sixteen track formatted data.

10. The head of claim 9, wherein the sixteen track formatted data is written to one of four data bands.

11. The head of claim 1, the legacy and incremental read elements further comprising write elements configured to write data.

12. The head of claim 1, further comprising legacy and incremental write elements configured to write data and each disposed along a direction of tape motion from a corresponding read element.

13. The head of claim 1, wherein the specified format conforms to a Linear Tape Open standard.

14. The head of claim 1, wherein the specified format conforms to an IBM 3592 format.

15. The head of claim 1, wherein the upper servo track, lower servo track, and mid servo track each has a height of ninety micrometers.

16. A method for reading magnetically encoded data, the method comprising:

reading an upper servo track conforming to a specified format with a upper servo element;

reading a lower servo track conforming to the specified format with a lower servo element;

reading a mid servo track disposed between the upper data track and the lower data track with a mid servo element;

reading legacy data tracks conforming to the specified format and disposed between the upper servo track and the lower servo track with legacy read elements; and reading eight incremental data tracks interleaved between the legacy data tracks disposed between the upper servo element and the mid servo element so that one incremental data track is adjacent to each legacy data track on a side of the legacy data track away from the mid servo track, wherein the increment data tracks are read with incremental read elements.

17. The method of claim 16, the method further comprising reading an upper data band of sixteen data tracks with eight legacy data tracks and the eight incremental data tracks disposed between the upper servo track and the mid servo track such that a distance between an upper most data track and a lowest data track of the sixteen legacy and incremental data tracks is less than a distance between an upper most data track and a lowest data track on a data band compatible with the specified format.

18. The method of claim 16, the method further comprising reading a lower data band of sixteen data tracks with eight legacy data tracks and eight incremental data tracks disposed between the lower servo track and the mid servo track such that a distance between an upper most data track and a lowest data track of the sixteen legacy and incremental data tracks is less than a distance between an upper most data track and a lowest data track on a data band compatible with the specified format.

19. A system to read data, the system comprising:

a tape configured to store magnetically encoded data;

a head comprising an upper servo element configured to read an upper servo track disposed on the tape and conforming to a specified format;

a lower servo element configured to a read a lower servo track disposed on the tape and conforming to the specified format;

a mid servo element configured to read a mid servo track disposed on the tape between the upper servo track and the lower servo track;

sixteen legacy read elements disposed between the upper servo element and the lower servo element and configured to read legacy data tracks disposed on the tape and conforming to the specified format; and eight incremental read elements interleaved between the legacy read elements disposed between the upper servo element and the mid servo element so that one incremental read element is adjacent to each legacy read element on a side of the legacy read element away from the mid servo element, the incremental read elements configured to read incremental data tracks disposed on the tape.

20. A computer program product comprising a computer useable storage medium storing a computer readable program stored on a tangible storage device, wherein the computer readable program when executed on a computer causes the computer to:

read an upper servo track conforming to a Linear Tape Open standard with an upper servo element;

read a lower servo track conforming to the Linear Tape Open standard with a lower servo element;

read a mid servo track with a height of ninety micrometers disposed between the upper data track and the lower data track with a mid servo element;

read legacy data tracks conforming to the Linear Tape Open standard and disposed between the upper servo track and the lower servo track with legacy read elements; and read eight incremental data tracks interleaved between the legacy data tracks disposed between the upper servo element and the mid servo element so that one incremental data track is adjacent to each legacy data track on a side of the legacy data track away from the mid servo track with incremental read elements.

* * * * *